Nov. 20, 1956 — W. H. TROEMEL — 2,770,978
MEANS FOR BALANCING THE LOADS ON PARALLEL BELTS
Filed July 21, 1953 — 2 Sheets-Sheet 1
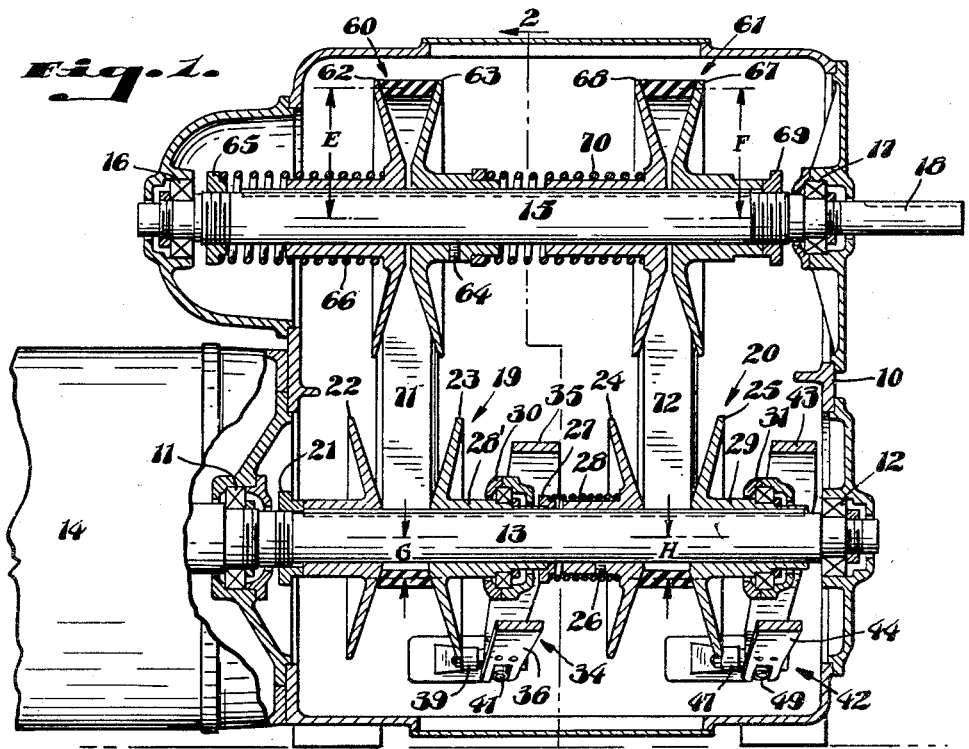
INVENTOR.
WALTER H. TROEMEL,
BY: Harold B. Hood
ATTORNEY.

Nov. 20, 1956          W. H. TROEMEL          2,770,978
MEANS FOR BALANCING THE LOADS ON PARALLEL BELTS
Filed July 21, 1953          2 Sheets-Sheet 2
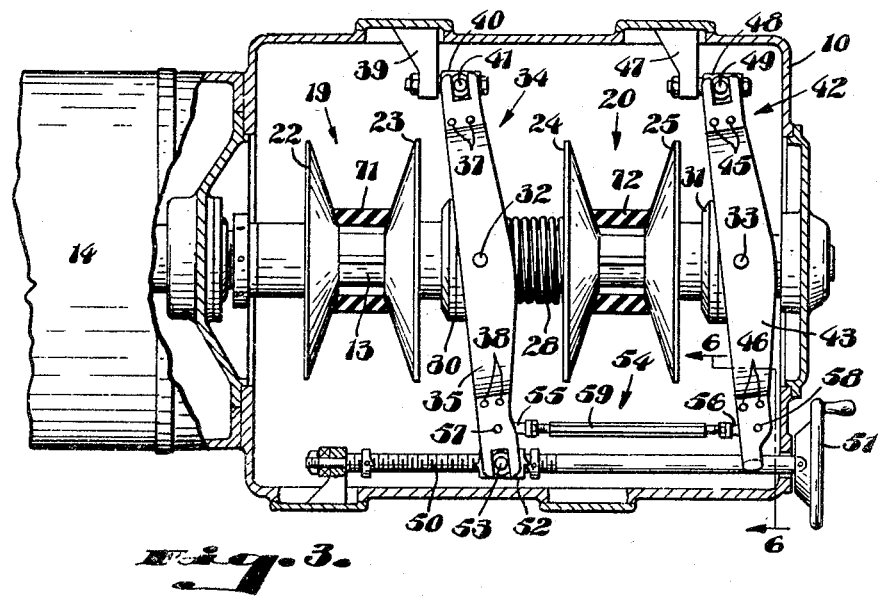
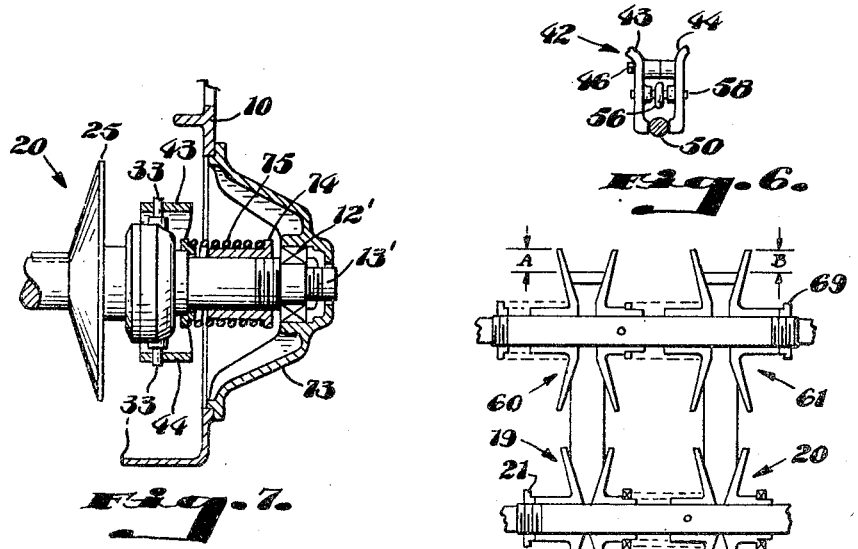
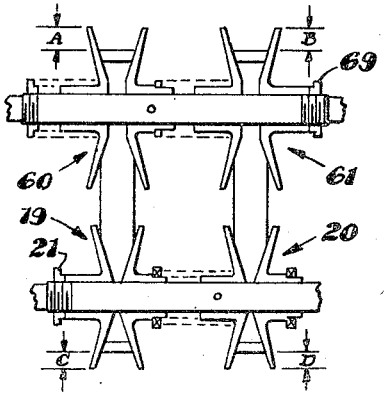
INVENTOR.
WALTER H. TROEMEL,
BY:
Harold B. Hood.
ATTORNEY.

United States Patent Office 2,770,978
Patented Nov. 20, 1956

2,770,978

MEANS FOR BALANCING THE LOADS ON PARALLEL BELTS

Walter H. Troemel, Columbus, Ind., assignor to Reeves Pulley Company, Columbus, Ind., a corporation of Indiana Application July 21, 1953, Serial No. 369,472

13 Claims. (Cl. 74—230.17)

The present invention relates to variable speed transmissions of the expansible V-pulley type and is particularly concerned with the provision of means for balancing the load between parallel belts used in such transmissions designed for extremely heavy-duty applications.

In transmissions of this type, it is customary to use a single belt to provide a driving connection between a constant speed shaft and a variable speed shaft. The ultimate load which can be placed upon the transmission is limited to the load which can be transmitted through the belt, and this, in turn, is directly dependent upon the size, structural characteristics and properties of the belt. There is, therefore, a maximum limit to the loads which can be placed upon such a transmission, when but a single belt is used, since the required physical dimensions of the belt and pulleys increase rapidly with slight increases in load requirements until the necessary physical dimensions exceed practical limits.

Attempts have been made to reduce the physical dimensions of a transmission of this type, where extremely high-load requirements are present, by using a pair of belts in parallel between pulleys on the constant and variable speed shafts. Such attempts have heretofore been unsuccessful since difficulties in balancing the load between the two belts have arisen due to variations in the pulleys and belts. Even slight variations in the face angles of the expansible V-pulleys and in the length and internal physical characteristics of the belts, will so unbalance the loads placed upon each belt as to cause frequent belt failure.

It is the primary object of the invention, therefore, to provide, in a variable speed transmission utilizing a pair of belts in parallel, means for insuring substantial balance between the loads placed upon the belts.

Another object is to provide means for easily and accurately adjusting the expansible pulleys to so equalize the loads placed upon the belts of such a pair.

A further object is to provide means for properly aligning the pulleys on the constant and variable speed shafts in such a transmission.

Still another object is to provide means for reducing the effort required to shift the movable parts of the transmission when changing the output speed thereof, such means acting also to relieve the stresses normally imposed upon the bearings and other supporting parts of such a transmission.

Further objects will become apparent as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a longitudinal sectional view through a transmission embodying a preferred form of my invention;

Fig. 2 is a transverse sectional view taken substantially on line 2—2 of Fig. 1 and showing details of the means for varying the output speed of the transmission;

Fig. 3 is a longitudinal sectional view taken substantially on line 3—3 of Fig. 2 and showing details of the balancing means in my transmission;

Fig. 4 is a sectional view, on an enlarged scale, taken substantially on line 4—4 of Fig. 2 and showing a detail of my invention;

Fig. 5 is a sectional view, on an enlarged scale, taken substantially on line 5—5 of Fig. 2 and showing a detail of the balancing means of my invention;

Fig. 6 is a sectional view taken substantially on line 6—6 of Fig. 3, and showing a further detail of my invention;

Fig. 7 is a longitudinal sectional view showing a modification of the bearing mounting means for one end of the constant speed shaft in my transmission; and Fig. 8 is a more or less diagrammatic illustration of the manner in which the pulleys of the transmission are brought into proper alignment.

Referring more particularly to the drawings, I have shown a frame 10 supporting bearings 11 and 12 in which is journalled a constant-speed shaft 13. A motor 14, or other suitable means for driving shaft 13, is drivingly connected to shaft 13. A variable-speed shaft 15 is suitably journalled in bearings 16 and 17, supported on frame 10, for rotation about an axis substantially parallel to, but spaced from, shaft 13. Power take-off means (not shown) is fixed to one end 18 of shaft 15.

Two expansible V-pulleys 19 and 20 are keyed on shaft 13. A collar 21 is threadedly adjustably supported on shaft 13 adjacent pulley 19. Pulley 19 comprises a pair of mating coned discs 22 and 23, and one disc 22 thereof abuts the collar 21 to adjustably hold said disc against movement along shaft 13 in the direction of collar 21. The other disc 23 of pulley 19 is axially movable on shaft 13 toward and away from disc 22.

Pulley 20 comprises a pair of mating coned discs 24 and 25, disc 24 thereof, adjacent pulley 19, being axially fixed to shaft 13 as by means of a set screw 26, or the like. Preferably, a collar 27 is supported on hub 28' of disc 23, and a coiled spring 28 is sleeved on the hub of disc 24 and confined between disc 24 of pulley 20 and the collar 27 to urge the disc 23 toward its mate.

Disc 23 of pulley 19 and disc 25 of pulley 20 each include a hub 28' and 29, respectively. An antifriction bearing 30 is axially fixed on cone hub 28', and an antifriction bearing 31 is axially fixed on cone hub 29. Bearing 30 is provided with a pair of diametrically oppositely projecting pins 32, 32 and bearing 31 is mounted with a similar pair of pins 33, 33.

A first yoke member, referred to generally by the reference numeral 34, comprises a pair of bowed side elements 35 and 36 straddling the bearing 30 and engaging respectively with the pins 32, 32. Elements 35 and 36 converge at opposite ends and are there fixed together, as by means of screws 37 and 38. A bracket 39, supported from frame 10, carries a connector block 40 supporting oppositely projecting pins 41, 41 and the adjacent end of each element 35 and 36 is bifurcated and straddles one of the pins 41, thereby providing a fixed pivotal connection for that end of yoke member 34.

A second yoke member, referred to generally by the reference numeral 42, comprises a pair of bowed side elements 43 and 44 engaging, respectively with pins 33, 33. Elements 43 and 44 converge at opposite ends and are fixed together, as by means of screws 45 and 46. A bracket 47 similar to bracket 39, is supported from frame 10 and carries a connector block 48 supporting oppositely projecting pins 49, 49. The adjacent end of each element 43 and 44 is bifurcated and straddles one of the pins 49, thereby providing a fixed pivotal connection for that end of yoke member 42.

A screw shaft 50 is journalled in frame 10 and provides a manipulating hand wheel 51 for rotation thereof. A nut 52 is threadedly received on screw-shaft 50 and is axially shiftable thereon upon rotation of said shaft. Nut 52 is provided with oppositely projecting pins 53, 53; and the adjacent ends of the side elements of one of the yoke members, here shown as member 34, are each bifurcated to straddle one of the pins 53, thereby providing a driving, pivotal connection between the nut 52 and that end of yoke member 34.

The end of yoke member 42, remote from bracket 47, is bifurcated (see Fig. 6) and straddles screw-shaft 50 in sliding engagement with the periphery thereof.

Spaced slightly from screw-shaft 50 is a link means, referred to generally by reference numeral 54. Such means comprises a pair of oppositely threaded portions 55 and 56 connected, respectively, to those ends of yoke members 34 and 42 engaging with screw-shaft 50 (see Fig. 5) by means of pivot pins 57 and 58. A tie-rod 59 threadedly engages with portions 55 and 56, at opposite ends thereof. Thus, by axial rotation of tie-rod 59, portions 55 and 56, and therefore the connected ends of yoke members 34 and 42, are adjustably movable toward and away from each other to adjustably position discs 23 and 25 relative to discs 22 and 24, respectively.

Two further expansible V-pulleys 60 and 61 are keyed on shaft 15 in substantial radial alignment with pulleys 19 and 20. Pulley 60 comprises a pair of mating coned discs 62 and 63. Disc 63 is axially fixed to shaft 15, as by means of a set-screw 64, or the like, and disc 62 is axially movable along shaft 15 toward and away from disc 63. A collar 65 is threadedly mounted on shaft 15 adjacent disc 62, and a coiled spring 66 is sleeved on shaft 15 and confined between collar 65 and disc 62 to urge said disc toward its mate.

Pulley 61 comprises a pair of mating coned discs 67 and 68. A collar 69 is threadedly adjustably supported on shaft 15 adjacent disc 67 and said disc abuts collar 69 to adjustably hold the same against movement along shaft 15 in the direction of said collar. The other disc 68 is axially movable on shaft 15 toward and away from its mate. A coiled spring 70 is sleeved on shaft 15 and is confined between disc 68 and the axially fixed disc 63 of pulley 60, to urge disc 68 toward its mate.

An edge-active belt 71 provides a driving connection between pulleys 19 and 60, and a second edge-active belt 72 provides a driving connection between pulleys 20 and 61.

When the mechanism is first assembled, or when new belts have been placed thereon, it is necessary first to align the pulleys 19 and 60, and the pulleys 20 and 61, and then to equalize the belts for proper load distribution. This is done substantially in the manner indicated in the diagrammatic sketch shown in Fig. 8. By rotation of screw-shaft 50, the pulleys are first adjusted to bring them substantially into their positions as shown. Collars 21 and 69 are then moved along their respective shafts until belts 71 and 72 are substantially at right angles to shafts 13 and 15. Tie rod 59 is then rotated to move discs 23 and 25 oppositely, relative to their mates, to satisfy the following conditions: A minus B should equal C minus D, or B minus A should equal D minus C. When these conditions are satisfied, the load will be substantially equally divided between belts 71 and 72.

Where the mechanism is to be adjusted for the transmission of maximum power, screw-shaft 50 is rotated to position the pulleys substantially as shown in Fig. 1, and tie-rod 59 is then manipulated to satisfy the following conditions: E divided by G should equal F divided by H (see Fig. 1).

In Fig. 7, I have shown a modified form of bearing mounting for bearing 12. A supplemental housing 73 is supported on frame 10 and in turn supports the bearing 12' in which the end of shaft 13' is journalled. A collar 74 is threadedly mounted on shaft 13' and a coiled spring 75 is confined between said collar and the movable disc 25 of pulley 20 to urge disc 25 toward its mate. It will be seen that springs 28 and 75 work in opposition to springs 66 and 70. While springs 66 and 70 tend, through belts 71 and 72, to move discs 23 and 25 to the right, as viewed in Fig. 1, springs 28 and 75 tend directly to move such discs to the left. All the springs exert a clamping force on the belts 71 and 72. The purpose of the springs 28 and 75, in addition to providing greater clamping force against belts 71 and 72, is to relieve the force necessary to shift the discs 23 and 25, against the force of springs 66 and 70, when moving the disc 23 and 25 to the left, as viewed in Fig. 1. In a device intended to be operated under load conditions as great as here under consideration, the force necessary to shift the discs 23 and 25 is very substantial, and either a single spring 28 or 75, or the concurrent use of both such springs, considerably facilitate such movement.

I claim as my invention:

1. In a device of the class described, a first shaft, a first pair of mating coned discs keyed on said shaft, an abutment element threadedly adjustably mounted on said shaft and engaged by one disc of said first disc pair to restrain said one disc against axial movement away from its mate, the other disc of said disc pair being axially movable toward and away from its mate, a second pair of mating coned discs keyed on said shaft adjacent said other disc of said first disc pair, that one disc of said second disc pair adjacent said other disc of said first disc pair being axially fixed on said shaft, and the other disc of said second disc pair being axially movable toward and away from its mate, a second shaft substantially parallel to said first shaft but spaced therefrom, a third pair of mating coned discs keyed on said second shaft in substantial radial alignment with said first disc pair, that one disc of said third disc pair opposite said other disc of said first disc pair being axially fixed on said second shaft and the other disc of said third disc pair being axially movable toward and away from its mate, means resiliently engaging the last-named disc to urge it toward its mate, a fourth pair of mating coned discs keyed on said second shaft in substantial radial alignment with said second disc pair, a second abutment element threadedly adjustably mounted on said second shaft and engaged by that one disc of said fourth disc pair opposite said other disc of said second disc pair to restrain the same against axial movement away from its mate, the other disc of said fourth disc pair being axially movable toward and away from its mate, means resiliently engaging the last-named disc to urge it toward its mate, a first edge-active belt providing a driving connection between said first and third disc pairs, and a second edge-active belt providing a driving connection between said second and fourth disc pairs, and means providing an operative connection between said other discs of said first and second disc pairs for synchronous adjustment of said discs toward and away from their mates.

2. The device of claim 1 including means resiliently engaging said other disc of said first disc pair to urge it toward its mate.

3. The device of claim 1 including means resiliently engaging said other disc of said second disc pair to urge it towards its mate.

4. The device of claim 1 including means resiliently engaging said other disc of said first disc pair to urge it toward its mate, and means resiliently engaging said other disc of said second disc pair to urge it toward its mate.

5. The device of claim 1 in which the last-said means comprises a first anti-friction element axially fixed but rotatable on said other disc of said first disc pair, a second anti-friction element axially fixed but rotatable on said other disc of said second disc pair, a first yoke member, means pivotally supporting said yoke member, means operatively connecting said yoke member, intermediate its ends, with said first anti-friction element, a second yoke member, means pivotally supporting said second yoke member, means operatively connecting said second yoke member intermediate its ends, with said second anti-friction element, link means connecting together the ends of the two said yoke members remote from said supporting means, and shifter means for moving said remote yoke ends axially relative to said first shaft, said shifter means comprising a screw shaft journalled for rotation about an axis substantially parallel to said first shaft and supporting a nut axially shiftable along said screw shaft upon rotation thereof, that end of one of said yoke members adjacent said link means being operatively connected for movement by said nut, and the corresponding end of the other of said yoke members being bifurcated and straddling said screw shaft in sliding contact with the periphery thereof.

6. The device of claim 5 in which said link means comprises oppositely threaded portions secured respectively to said yoke members, and a tie-rod threadedly engaging with said portions at the opposite ends thereof, rotation of said tie-rod about its axis causing said portions to move toward or away from each other to vary the effective length of said link means.

7. In a device of the class described, a first shaft, a first pair of mating coned discs keyed on said shaft, a collar axially adjustably supported on said shaft and abutting one of the discs of said first disc pair to hold said disc against movement on said shaft in the direction of said collar, the other disc of said first disc pair being axially movable toward and away from its mate, a second pair of mating coned discs keyed on said shaft adjacent said other disc of said first disc pair, that one disc of said second disc pair adjacent said other disc of said first disc pair being axially fixed on said shaft and the other disc of said second disc pair being axially movable toward and away from its mate, a coiled spring sleeved on said first shaft and confined between said other disc of said first disc pair and said one disc of said second disc pair to urge said other disc of said first disc pair toward its mate, a second shaft substantially parallel to said first shaft, a third pair of mating coned discs keyed on said second shaft in substantial radial alignment with said first disc pair, that one disc of said third disc pair opposite said other disc of said first disc pair being axially fixed to said second shaft and the other disc of said third disc pair being axially movable toward and away from its mate, abutment means on said second shaft adjacent said other disc of said third disc pair, a coiled spring sleeved on said second shaft and confined between said last-named abutment means and the last-named disc to urge said disc toward its mate, a fourth pair of mating coned discs keyed on said second shaft in substantial radial alignment with said second disc pair, another collar axially adjustably supported on said second shaft adjacent said fourth disc pair but on the side thereof opposite said third disc pair, said collar abutting that one disc of said fourth disc pair opposite said other disc of said second disc pair to hold said disc against movement on said second shaft in the direction of said other collar, the other disc of said fourth disc pair being axially movable toward and away from its mate, a coiled spring sleeved on said second shaft and confined between said one disc of said third disc pair and said other disc of said fourth disc pair to urge the last-named disc toward its mate, a first edge-active belt providing a driving connection between said first and third disc pairs, a second edge-active belt providing a driving connection between said second and fourth disc pairs, and means providing an operative connection between said other discs of said first and second disc pairs for synchronous adjustment of said discs toward and away from their mates.

8. The device of claim 7 including another coiled spring sleeved on said first shaft, abutment means on said first shaft adjacent said other disc of said second disc pair, said other spring being confined between said abutment means and the last-named disc to urge the same toward its mate.

9. The device of claim 7 in which the last said means comprises a first bearing means axially fixed to said other disc of said first disc pair, a second bearing means axially fixed to said other disc of said second disc pair, a screw shaft journalled for rotation about an axis substantially parallel to said first shaft but spaced therefrom, a first yoke member straddling said first bearing means, means providing an operative connection between said first bearing means and said first yoke member, means pivotally supporting one end of said first yoke member at a point on the side of said first shaft opposite said screw shaft, a second yoke member straddling said second bearing means, means providing an operative connection between said second bearing means and said second yoke member, means pivotally supporting one end of said second yoke member at a point on the side of said first shaft opposite said screw shaft, a nut threaded on said screw shaft and axially movable thereon upon rotation of said screw shaft, means providing an operative connection between said nut and the adjacent end of one of said yoke members, the adjacent end of the other yoke member being bifurcated to straddle said screw shaft in sliding contact with the periphery thereof, and link means connecting together the said adjacent ends of said yoke members.

10. The device of claim 9 in which said link means comprises oppositely threaded portions secured respectively to said yoke members, and a tie-rod threadedly engaging with said portions at opposite ends thereof, rotation of said tie rod about its axis causing said portions to move toward or away from each other to vary the effective length of said link means.

11. The device of claim 10 including a second coiled spring sleeved on said first shaft, abutment means supported on said shaft adjacent said other disc of said second disc pair, said second coiled spring being confined between said abutment means and said other disc to urge said disc toward its mate.

12. In a device of the class described, two parallel shafts, a first expansible V-pulley and a second expansible V-pulley drivingly supported from one of said shafts, a third expansible V-pulley and a fourth expansible V-pulley drivingly supported from the other of said shafts, a V-belt providing a driving connection between said first and third pulleys, a second V-belt providing a driving connection between said second and fourth pulleys, each of said pulleys comprising two mating coned discs, means restraining one disc of each pulley against axial movement away from its mate, and means for shifting the other disc of each pulley toward said one disc thereof, the means for so shifting the other discs of said first and second pulleys comprising bearing means axially fixed relative to said other disc of said first pulley, bearing means axially fixed relative to said other disc of said second pulley, means connecting said bearing means for concurrent or relative axial movement comprising an element operatively connected to said first-named bearing means, an element operatively connected to said second-named bearing means, a threaded member connected to one of said elements, a threaded member connected to the other of said elements, and a tie rod threadedly engaged at its opposite ends with said members, and means engaging one of said elements for shifting the same oppositely generally in the direction of the axis of said one shaft.

13. The device of claim 12 in which the means for so restraining said one disc of said first pulley comprises a threaded element mounted for threaded adjustment in the direction of the axis of said one shaft, and the means for so restraining said one disc of said fourth pulley comprises a threaded element mounted for threaded adjustment in the direction of the axis of said other shaft.

References Cited in the file of this patent

UNITED STATES PATENTS

| | | |
|---|---|---|
| 2,299,921 | Myers | Oct. 27, 1942 |
| 2,398,235 | Luenberger | Apr. 9, 1946 |
| 2,431,494 | Morse | Nov. 25, 1947 |
| 2,571,920 | Michie | Oct. 16, 1951 |

FOREIGN PATENTS

| | | |
|---|---|---|
| 20,900 | Great Britain | of 1914 |